United States Patent Office 2,849,466
Patented Aug. 26, 1958

2,849,466

PREPARATION OF α,β-UNSATURATED ACIDS

Otto Isler and Rudolf Ruegg, Basel, Switzerland, assignors to Hoffmann-La Roche Inc., Nutley, N. J., a corporation of New Jersey No Drawing. Application January 26, 1955
Serial No. 484,316

Claims priority, application Switzerland
February 12, 1954

2 Claims. (Cl. 260—410.9)

This invention relates broadly to the preparation of α,β-unsaturated carboxylic acids and their esters. A major object of the invention is to provide an improved process for preparing such acids and esters. Another important object is to provide a process for preparing α,β-unsaturated carboxylic acids and their esters which shall be readily adaptable to commercial scale manufacture, and particularly one which avoids the necessity of resorting to unstable intermediates or dangerous reaction conditions.

The process of the invention can be illustrated graphically in terms of the following flow sheet:

FLOW SHEET

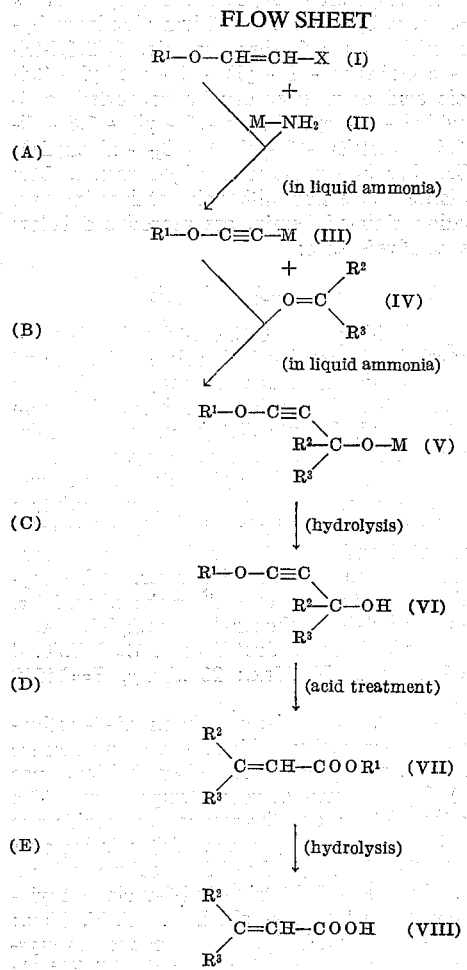

In the above flow sheet,

X represents a halogen, such as chlorine and bromine.
M represents an alkali metal, such as lithium, sodium and potassium.

$R^1$ represents the organic radical of an alcohol or a phenol. Preferred are hydrocarbon radicals having seven or less carbon atoms, e. g. lower alkyl radicals such as methyl and ethyl, and aryl hydrocarbon radicals such as phenyl and tolyl.

$R^2$ represents hydrogen, or a hydrocarbon radical, or a hydrocarbon radical substituted by functional groups. Preferred are hydrogen and aliphatic hydrocarbon radicals.

$R^3$ represents a hydrocarbon radical, or a hydrocarbon radical substituted by functional groups. Preferred are aliphatic hydrocarbon radicals, cycloaliphatic hydrocarbon radicals, and cycloaliphatic-aliphatic hydrocarbon radicals.

When $R^2$ and $R^3$ both represent hydrocarbon or substituted hydrocarbon radicals, they may be joined to each other, thereby forcing a homocyclic ring with the carbonyl carbon atom.

Illustrative embodiments of the β - halovinyl ether reactant represented above by the general Formula I are β-chlorovinyl methyl ether, β-chlorovinyl ethyl ether, β-bromovinyl ethyl ether and β-chlorovinyl phenyl ether.

Illustrative embodiments of the alkali metal amide reactant represented above by the general Formula II are lithium amide, sodium amide and potassium amide.

Illustrative embodiments of the carbonyl compound reactant represented above by the general Formula IV are saturated aliphatic aldehydes, such as propionaldehyde and butyraldehyde; unsaturated aliphatic aldehydes, such as methacrolein, β-methylcrotonaldehyde and citral; cycloaliphatic-aliphatic aldehydes, such as 4-(2, 6,6-trimethyl - 1 - cyclohexen-1-yl)-2-methyl-2-buten-1-al; aromatic aldehydes, such as benzaldehyde; aromatic-aliphatic aldehydes, such as cinnamaldehyde; saturated aliphatic ketones, such as acetone, methyl ethyl ketone and di-ethyl ketone; unsaturated aliphatic ketones such as mesityl oxide, methylheptenone, dimethylheptenone and pseudoionone; saturated cycloaliphatic ketones such as cyclohexanone and 2,6,6 - trimethyl - 1 - cyclohexanone; unsaturated cycloaliphatic ketones such as cyclohexenone and 2,6,6-trimethyl-2-cyclohexen-1-one; cycloaliphatic-aliphatic ketones such as dihydro-β-ionone, β-ionone and 8 - (2,6,6 - trimethyl - 1 - cyclohexen - 1 - yl) - 6 - methyl-3,5,7-octatrien-2-one; and aromatic-aliphatic ketones such as acetophenone. Diketones, both saturated and unsaturated, can also be employed for the condensation, such as acetonylacetone and 4-octen-2,7-dione, and likewise saturated and unsaturated dialdehydes, such as succinic acid dialdehyde, 2,7-dimethyl-2,4,6-octatriene-1, 8-dial and 2,7-dimethyl-2,6-octadien-4-yne-1,8-dial. Aldehydes and ketones containing functional groups can also be employed for the condensation, e. g. methoxyacetone, levulinic acid, p-dimethylaminobenzaldehyde, p-hydroxybenzaldehyde, androsterone and estrone.

As will be apparent from the above flow sheet, one comprehensive aspect of the invention relates to an improved process of making an α,β-unsaturated carboxylic acid (VIII) which comprises the steps of: (A) reacting a β-halovinyl ether (I) with an alkali metal amide (II) in liquid ammonia; (B) condensing the thus obtained alkali metal acetylide of an ethinyl ether (III) in liquid ammonia with a carbonyl compound (IV) selected from the group consisting of aldehydes and ketones; (C) converting the acetylenic condensation product obtained (V) to an acetylenic carbinol (VI); (D) contacting said acetylenic carbinol with a liquid acidic medium thereby obtaining an ester (VII) of an α,β-unsaturated carboxylic acid; and (E) hydrolyzing said ester to obtain the free α,β-unsaturated carboxylic acid (VIII).

A preferred embodiment of the invention relates to a process which comprises the steps of treating a β-halovinyl lower alkyl ether with an alkali metal amide in liquid ammonia, condensing the thus obtained liquid ammonia solution of alkali metal acetylide of ethinyl lower alkyl ether with a carbonyl compound selected from the group consisting of aldehydes and ketones, hydrolyzing the condensation product formed, removing the ammonia, mixing the hydrolysis product with a dilute aqueous solution of a mineral acid thereby producing an ester of an α,β-unsaturated carboxylic acid; and (if desired) hydrolyzing said ester.

The first stage (A) in the process of the invention comprises the reaction of a β-halovinyl ether with two equivalents of an alkali metal amide in liquid ammonia. One equivalent of the alkali metal amide thereby splits out hydrogen halide from the β-halovinyl ether, with formation of an ethinyl ether, and with simultaneous formation of an alkali metal halide and of ammonia. The second equivalent of the alkali metal amide substitutes the active hydrogen at the triple bond of the ethinyl ether by an atom of the alkali metal, with formation of a second mol of ammonia. The operation of stage (A) can be conducted either in an open vessel at the boiling temperature of ammonia or in a pressure vessel at room temperature. The β-halovinyl ether can be added to a solution of the alkali metal amide in liquid ammonia, which latter can be prepared for instance by dissolving an alkali metal in liquid ammonia. Before addition of the β-halovinyl ether, the latter can be diluted with an inert solvent, for example diethyl ether. A small excess of the β-halovinyl ether may be employed for the reaction. The alkali metal acetylide of the ethinyl ether, resulting from the reaction, is stable in liquid ammonia. It can be employed without isolation for the next stage (B) of condensation with an aldehyde or ketone. The preparation of the alkali metal acetylide of the ethinyl ether is attended with no unusual danger, and gives excellent yields.

The next stage (B) of the process comprises the condensation of the alkali metal acetylide of the ethinyl ether in liquid ammonia with an aldehyde or ketone. It is suitable to conduct this step in the same reaction vessel in which is prepared the liquid ammonia solution of the alkali metal acetylide. Unreacted β-halovinyl ether, and alkali metal halide produced during the first stage, do not interfere with the condensation. Especially suited for this condensation step are those aldehydes and ketones which are stable in liquid ammonia. It is expedient to use the carbonyl compound in an approximately molar equivalent amount to the alkali metal compound. When employing carbonyl compounds which are poorly soluble in liquid ammonia, vigorous stirring is indicated. In addition, in this case it is advantageous to add an inert solvent, e. g. diethyl ether. When dicarbonyl compounds are employed as carbonyl reactants, they are advantageously treated with at least two molar equivalents of the alkali metal acetylide whereby both carbonyl groups enter into the reaction. Whenever the carbonyl reactant contains a free hydroxyl or carboxyl group, as in the case of levulinic acid, p-hydroxybenzaldehyde, androsterone and estrone, an additional mol of the alkali metal amide is employed for each of such free hydroxyl or carboxyl groups. In condensing alkali-sensitive carbonyl compounds, e. g. when using α,β-unsaturated aldehydes as reactants (IV), it is preferable to employ the lithium acetylide of the ethinyl ether as the alkali metal acetylide (III). The condensation product (V) formed in stage (B) is stable in liquid ammonia. It need not be isolated nor purified for further use in the process.

The next stage (C) of the process comprises conversion of the condensation product (V) to the acetylenic carbinol (VI), e. g. by hydrolysis. A convenient procedure comprises reacting an ammonium salt, e. g. ammonium chloride, with the condensation product (V) while the latter is still contained in the liquid ammonia medium in which it is formed, and then evaporating the ammonia.

The succeeding stage (D) in the process comprises mixing the acetylenic carbinol (VI) with a liquid acidic medium. A convenient mode of execution comprises taking up the acetylenic carbinol (VI) in an inert solvent, e. g. diethyl ether, and shaking the resulting solution with a dilute aqueous solution of a mineral acid, e. g. 10 percent aqueous sulfuric acid. The acid treatment effects a rearrangement of the acetylenic carbinol (VI) thereby forming an ester (VII) of an α,β-unsaturated carboxylic acid. The ester can be isolated and used as such.

Alternatively, in the optional step (E) shown in the flow sheet, the ester (VII) can be hydrolyzed, e. g. by heating the ester with dilute aqueous alkali; either before or after purification of the ester; thereby producing the free α,β-unsaturated carboxylic acid (VIII).

The α,β-unsaturated carboxylic acids and their esters, obtained according to the invention, can be purified according to methods which are known per se, e. g. by distillation or crystallization. These acids and esters possess characteristic absorption bands in the ultraviolet- and infrared-spectra.

The α,β-unsaturated carboxylic acids and their esters are useful as intermediates, e. g. in the preparation of perfume bases and of polyene compounds having biological activity. Thus, for example, 3,7-dimethyl-2,6-octadien-1-oic acid ethyl ester can be reduced by methods known per se, e. g. by the use of lithium aluminum hydride, to geraniol. As a further example, 6-(2,6,6-trimethyl - 1 - cyclohexen - 1 - yl) - 4 - methyl - 2,4-hexadien-1-oic acid ethyl ester can be converted to 8-(2,6,6 - trimethyl - 1 - cyclohexen - 1 - yl) - 2,6 - dimethyl - 2,4,6 - octatrien - 1 - al (β - $C_{19}$ - aldehyde), an intermediate in a known synthesis of β-carotene. The steps in the latter conversion, although not forming part of the invention claimed herein, are reproduced below for convenience of reference:

*Preparation of β-$C_{19}$-aldehyde*

A mixture of 66 g. of 6-(2,6,6-trimethyl-1-cyclohexenyl)-4-methyl-2,4-hexadien-1-oic acid ethyl ester and 400 cc. of absolute diethyl ether was slowly added, while cooling externally with ice, to 9 g. of lithium aluminum hydride in 100 cc. of absolute diethyl ether. The mixture was then refluxed for 30 minutes. It was allowed to cool, whereupon 30 cc. of ethyl acetate was slowly added. The mixture was then poured on to a mixture of ice and 800 cc. of 3 N sulfuric acid. The ether solution was separated and washed with 5 percent aqueous sodium bicarbonate solution and with water. After drying over sodium sulfate and evaporating the ether, 56 g. of 6-(2,6,6-trimethyl-1-cyclohexenyl)-4-methyl-2,4-hexadien-1-ol remained. This product boils at 120° C./0.04 mm.; $n_D^{24}$=1.5312; U. V. Max.: 237.5 mμ, E=24500 (in alcohol).

51.5 g. of 6-(2,6,6-trimethyl-1-cyclohexenyl)-4-methyl-2,4-hexadien-1-ol was shaken with 250 g. of manganese dioxide in 500 cc. of dry petroleum ether (boiling range 30°–60° C.) for 12 hours at room temperature. The mixture was then filtered and the manganese dioxide was washed with 1000 cc. of diethyl ether. After drying over sodium sulfate, the filtrate was freed from solvent, whereupon 49.5 g. of crude 6-(2,6,6-trimethyl-1-cyclohexenyl)-4-methyl-2,4-hexadien-1-al were obtained. U. V. Max.: 285 mμ, E=24000 (in alcohol). The product was crystallized from petroleum ether. Melting point 78–79° C.; U. V. Max.: 285mμ, E=31000 (in alcohol).

23.2 g. of 6-(2,6,6-trimethyl-1-cyclohexenyl)-4-methyl-2,4-hexadien-1-al, and 19.5 g. of α-bromopropionic acid ethyl ester in 100 cc. of absolute diethyl ether were refluxed for 2½ hours with 8 g. of granulated zinc. Then the mixture was poured on a mixture of ice and 200 cc. of 3 N sulfuric acid, the ether layer was separated and washed with a 5 percent aqueous sodium bicarbonate solution and with water. After drying and evaporating the ether, there was obtained 32.5 g. of 8-(2,6,6-trimethyl-1-cyclohexenyl) - 2,6-dimethyl-3-hydroxy-4,6-octadien-1-oic acid ethyl ester. $n_D^{25}=1.5125$; U. V. Max.: 239 m$\mu$, E=30000 (in alcohol).

32 g. of 8-(2,6,6-trimethyl-1-cyclohexenyl)-2,6-dimethyl-3-hydroxy-4,6-octadien-1-oic acid ethyl ester were heated to boiling in 200 cc. of toluene with 0.3 g. of p-toluenesulfonic acid for 2 hours, during which time 100 cc. of toluene distilled off together with the water produced. After cooling, the toluene solution was washed with 5 percent aqueous sodium bicarbonate solution and with water. The toluene was distilled off in vacuo, and then the 8-(2,6,6-trimethyl-1-cyclohexenyl)-2,6-dimethyl-2,4,6-octatrien-1-oic acid ethyl ester was purified by distilling under high vacuum. Boiling point 132° C./0.015 mm.; $n_D^{20}=1.5425$; U. V. Max.: 310 m$\mu$, E=24600 (in alcohol).

A mixture of 19.6 g. of 8-(2,6,6-trimethyl-1-cyclohexenyl)-2,6-dimethyl-2,4,6-octatrien-1-oic acid ethyl ester and 80 cc. of absolute diethyl ether was slowly added, while cooling with ice, to 2.35 g. of lithium aluminum hydride in 70 cc. of absolute diethyl ether. Then the mixture was refluxed for ½ hour. After cooling, 10 cc. of ethyl acetate was slowly added and the mixture was poured on a mixture of ice and 100 cc. of 3 N sulfuric acid. The ether layer was separated and washed with 5 percent aqueous sodium bicarbonate solution and with water. After drying and distilling off the ether, there was obtained 17 g. of 8-(2,6,6-trimethyl-1-cyclohexenyl)-2,6-dimethyl-2,4,6-octatrien-1-ol; $n_D^{24}=1.5503$; U. V. Max.: 278.5 m$\mu$; E=28000 (in alcohol).

16.5 g. of 8-(2,6,6-trimethyl-1-cyclohexenyl)-2,6-dimethyl-2,4,6-octatrien-1-ol were shaken in 200 cc. of dry petroleum ether (boiling range 30°–60° C.) with 80 g. of manganese dioxide for 12 hours at room temperature. The mixture was filtered and the manganese dioxide was washed with 500 cc. of diethyl ether. After drying over sodium sulfate and removal of the solvent by distillation, 16.1 g. of crude 8-(2,6,6-trimethyl-1-cyclohexenyl)-2,6-dimethyl-2,4,6-octatrien-1-al was obtained; absorption maximum in the ultraviolet spectrum at 328 m$\mu$, E=28000 (in alcohol). The product crystallized from petroleum ether; melting point 62–63° C.; U. V. Max.: at 328 m$\mu$, E=45500 (in alcohol).

EXAMPLE I

To 500 cc. of dry liquid ammonia was added 100 mg. of ferric nitrate, and a few minutes later while stirring 300 mg. of sodium. Dry air was blown into the blue solution for one minute. Then 13.8 g. of sodium was added slowly in small pieces, with a wait after each addition until the blue color of the solution disappeared. Then 37.5 g. of β-chlorovinyl ethyl ether was added with vigorous stirring, and 10 minutes later 31 g. of 6-methyl-5-hepten-2-one was slowly dropped in. The mixture was stirred for an additional period of 40 hours, then was reacted slowly with 45 g. of ammonium chloride; finally the ammonia was evaporated off. 800 cc. of absolute petroleum ether was added to the residue, and the mixture was filtered. The petroleum ether solution, after drying over sodium sulfate, was concentrated, and the residue was distilled, yielding 26 g. of 1-ethoxy-3-hydroxy-3,7-dimethyl-6-octen-1-yne, B. P. 80° C. at 0.05 mm., and 10 g. of unreacted methylheptenone. The former compound was dissolved in 300 cc. of diethyl ether and was shaken with 100 cc. of 10 percent aqueous sulfuric acid solution at room temperature for 16 hours. The reaction mixture was thereupon diluted with water, and the ether layer was separated and washed once with water and dried over sodium sulfate. Upon removal of the ether there was obtained 21 g. of the ethyl ester of 3,7-dimethyl-2,6-octadien-1-oic acid. This compound was refluxed for 2 hours with a solution containing 350 cc. of methanol, 35 cc. of water and 12.5 g. of sodium hydroxide. The reaction mixture was then diluted with 1 liter of water, and washed with diethyl ether, the aqueous solution was acidified with dilute sulfuric acid and extracted with diethyl ether. There was thus obtained 16 g. of 3,7-dimethyl-2,6-octadien-1-oic acid; B. P. 90° C. at 0.03 mm.; $n_D^{23}=1.4769$. Yield, 57 percent of theory, taking into account the recovered methylheptenone.

EXAMPLE II

To 500 cc. of dry liquid ammonia was added 100 mg. of ferric nitrate and a few minutes later while stirring 100 mg. of lithium. Dry air was blown into the blue solution for one minute. Then 4.1 g. of lithium was added slowly with a wait after each addition until the blue color of the solution disappeared. Thereupon 37.5 g. of β-chlorovinyl ethyl ether was added while stirring well, and 10 minutes later 51 g. of 4-(2,6,6-trimethyl-1-cyclohexen-1-yl)-2-methyl-2-buten-1-al dissolved in 100 cc. of absolute diethyl ether was slowly dropped in. The mixture was stirred for 20 hours, then slowly reacted with 45 g. of ammonium chloride, following which the ammonia was allowed to evaporate. 800 cc. of absolute diethyl ether was added and the mixture was filtered. The ethereal solution was dried over sodium sulfate and concentrated to a volume of 500 cc. and then shaken for 16 hours at room temperature with 200 cc. of 10 percent aqueous suufuric acid. The ether solution was separated, washed once with water, dried over sodium sulfate and concentrated. There was thereby obtained 65 g. of the crude ethyl ester of 6-(2,6,6-trimethyl-1-cyclohexen-1-yl)-4-methyl-2,4-hexadien-1-oic acid. (This ester, when purified by distillation under high vacuum, has B. P. 118–119° C./0.04 mm.; $n_D^{25}=1.5237$; U. V. Max.: 272.5 m$\mu$, E=23600 (in ethanol).) The crude ester was refluxed for 2 hours with a solution consisting of 700 cc. of methanol, 70 cc. of water and 25 g. of sodium hydroxide. The reaction mixture was then diluted with 2 liters of water and washed with diethyl ether in aqueous solution, was acidified with dilute sulfuric acid and extracted with diethyl ether. There was thus obtained 41.7 g. of 6-(2,6,6-trimethyl-1-cyclohexen-1-yl)-4-methyl-2,4-hexadien-1-oic acid, which upon standing solidified in a crystalline mass. U. V. Max.: 255 m$\mu$, $$E_1^1=617$$

(in ethanol) yield, 67 percent of theory. The methyl ester of this acid had a boiling point of 116° C. at 0.07 mm., $n_D^{21}=1.5242$; U. V. Max.: 268 m$\mu$, $$E_1^1=608$$

(in ethanol).

We claim:

1. A process of making an α,β-unsaturated carboxylic acid which comprises the steps of reacting a β-halovinyl ether with an alkali metal amide in liquid ammonia, condensing the thus obtained alkali metal acetylide of an ethinyl ether in liquid ammonia with a carbonyl compound selected from the group consisting of aldehydes and ketones, converting the acetylenic condensation product obtained to an acetylenic carbinol; contacting said acetylenic carbinol with a liquid acidic medium thereby obtaining an ester of an α,β-unsaturated carboxylic acid, and hydrolyzing said ester.

2. A process which comprises treating a β-halovinyl lower alkyl ether with an alkali metal amide in liquid ammonic, condensing the thus obtained liquid ammonia solution of alkali metal acetylide of ethinyl lower alkyl ether with a carbonyl compound selected from the group consisting of aldehydes and ketones, hydrolyzing the condensation product formed, removing the ammonia, and mixing the hydrolysis product with a dilute aqueous solution of a mineral acid.

References Cited in the file of this patent

UNITED STATES PATENTS

| | | |
|---|---|---|
| 2,203,363 | Ralston | June 4, 1940 |
| 2,628,979 | Arens et al | Feb. 17, 1953 |
| 2,636,898 | Buckley | Apr. 28, 1953 |

OTHER REFERENCES

Niewland et al., The Chemistry of Acetylene, 1945, pages 18, 19, 41.

Johnson, vol. 1, Acetylenic Alcohols, 1946, pages 3, 4, 347.

Wagner-Zook, Synthetic Organic Chemistry, 1953, pages 162, 163 and 169.

UNITED STATES PATENT OFFICE

CERTIFICATE OF CORRECTION

Patent No. 2,849,466                                       August 26, 1958

Otto Isler et al.

It is hereby certified that error appears in the above numbered patent requiring correction and that the said Letters Patent should read as corrected below.

In the grant, line 1, and in the heading to the printed specification, line 3, name of co-inventor, for "Rudolf Ruegg" read -- Rudolf Rüegg --; in the printed specification, column 2, line 18, for "forcing" read -- forming --; line 37, for "di-ethyl" read -- diethyl --; column 3, line 66, for "reactants" read -- reactant --; column 6, line 31, for "suufuric" read -- sulfuric --; line 71, for "ammonic" read -- ammonia --.

Signed and sealed this 4th day of November 1958.

(SEAL)

Attest:

KARL H. AXLINE

Attesting Officer

ROBERT C. WATSON
Commissioner of Patents